(12) United States Patent
Swart et al.

(10) Patent No.: US 11,976,582 B2
(45) Date of Patent: May 7, 2024

(54) METHODS FOR DIAGNOSTICS AND OPERATION OF AN EMISSIONS AFTERTREATMENT SYSTEM

(71) Applicant: PACCAR Inc, Bellevue, WA (US)

(72) Inventors: Charles Wayne Reinhardt Swart, Bellingham, WA (US); Cynthia Chaffin Webb, Sedro-Woolley, WA (US); Maarten Meijer, Anacortes, WA (US); Varun Ramesh, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 64 days.

(21) Appl. No.: 17/002,496

(22) Filed: Aug. 25, 2020

(65) Prior Publication Data

US 2022/0025798 A1    Jan. 27, 2022

Related U.S. Application Data

(60) Provisional application No. 63/054,468, filed on Jul. 21, 2020, provisional application No. 63/056,131,
(Continued)

(51) Int. Cl.
*F01N 3/20* (2006.01)
*F01N 3/10* (2006.01)
*F01N 11/00* (2006.01)

(52) U.S. Cl.
CPC ............. *F01N 3/208* (2013.01); *F01N 3/108* (2013.01); *F01N 11/002* (2013.01); *F01N 2550/05* (2013.01); *F01N 2570/14* (2013.01); *F01N 2610/02* (2013.01); *F01N 2900/1404* (2013.01); *F01N 2900/1411* (2013.01); *F01N 2900/1602* (2013.01); *F01N 2900/1621* (2013.01)

(58) Field of Classification Search
CPC .... F01N 11/00; F01N 11/002; F01N 13/0093; F01N 2550/02; F01N 2550/05; F01N 2570/14; F01N 2610/02; F01N 2900/08; F01N 2900/1404; F01N 2900/1411; F01N 2900/1602; F01N 2900/1621; F01N 3/108; F01N 3/208; Y02T 10/12; Y02T 10/40; Y02A 50/20
See application file for complete search history.

(56) References Cited

U.S. PATENT DOCUMENTS 5,570,576 A    11/1996 Ament et al.
5,588,291 A    12/1996 Maus et al.
(Continued)

FOREIGN PATENT DOCUMENTS

CN    106246301 B    7/2019
DE    10 2010 034707 A1    2/2012
(Continued)

*Primary Examiner* — Phutthiwat Wongwian
*Assistant Examiner* — Diem T Tran
(74) *Attorney, Agent, or Firm* — Seed IP Law Group LLP

(57) ABSTRACT

The present disclosure describes methods for evaluating NOx conversion efficiency of a close coupled SCR unit of an EAS including the close coupled SCR unit and a downstream SCR unit. The determined NOx conversion efficiency of the close coupled SCR unit is used to diagnose the close coupled SCR unit and or EAS and to control operation parameters of the EAS and/or internal combustion engine operably connected to the EAS.

19 Claims, 10 Drawing Sheets

Related U.S. Application Data filed on Jul. 24, 2020, provisional application No. 63/057,043, filed on Jul. 27, 2020.

(56) References Cited

U.S. PATENT DOCUMENTS

| | | |
|---|---|---|
| 5,600,947 A | 2/1997 | Cullen |
| 5,787,705 A | 8/1998 | Thoreson |
| 8,778,290 B1 | 7/2014 | Ren et al. |
| 8,818,691 B2 | 8/2014 | Douglas et al. |
| 10,161,276 B2 | 12/2018 | Miao et al. |
| 10,690,033 B1 | 6/2020 | Johnson et al. |
| 10,753,255 B2 | 8/2020 | Schweizer |
| 10,760,513 B1 | 9/2020 | Huhn et al. |
| 10,808,594 B2 | 10/2020 | Dimoski et al. |
| 10,920,641 B2 | 2/2021 | Kinnaird et al. |
| 11,035,274 B2 | 6/2021 | Johansson et al. |
| 11,181,026 B1 | 11/2021 | Webb et al. |
| 2004/0128983 A1* | 7/2004 | Okada ................ F01N 11/007 60/277 |
| 2006/0153761 A1 | 7/2006 | Bandl-Konrad et al. |
| 2007/0079605 A1 | 4/2007 | Hu et al. |
| 2007/0082783 A1 | 4/2007 | Hu et al. |
| 2007/0122317 A1 | 5/2007 | Driscoll et al. |
| 2007/0193253 A1 | 8/2007 | Tsumagari |
| 2008/0072575 A1 | 3/2008 | Yan |
| 2008/0243358 A1 | 10/2008 | Kojima et al. |
| 2008/0295493 A1 | 12/2008 | Applegate et al. |
| 2009/0035194 A1 | 2/2009 | Robel et al. |
| 2009/0158706 A1 | 6/2009 | Sun |
| 2009/0183501 A1 | 7/2009 | Gonze et al. |
| 2010/0242440 A1 | 9/2010 | Garimella et al. |
| 2011/0000194 A1 | 1/2011 | Gonze et al. |
| 2011/0047964 A1 | 3/2011 | Yezerets et al. |
| 2011/0061372 A1 | 3/2011 | Levijoki et al. |
| 2011/0265452 A1 | 11/2011 | Geveci et al. |
| 2011/0271660 A1 | 11/2011 | Gonze et al. |
| 2012/0085082 A1 | 4/2012 | Levijoki et al. |
| 2013/0146024 A1 | 6/2013 | Cunningham et al. |
| 2013/0232958 A1 | 9/2013 | Ancimer et al. |
| 2013/0311065 A1 | 11/2013 | Sun et al. |
| 2014/0033683 A1 | 2/2014 | Wei et al. |
| 2014/0363358 A1 | 12/2014 | Udd et al. |
| 2015/0023853 A1 | 1/2015 | Wittrock et al. |
| 2015/0040540 A1* | 2/2015 | Hulser ................ F02D 41/1463 60/274 |
| 2015/0040543 A1 | 2/2015 | Shetney et al. |
| 2015/0096287 A1 | 4/2015 | Qi |
| 2015/0151251 A1 | 6/2015 | Gaudin |
| 2015/0247435 A1* | 9/2015 | Garimella ................ F01N 3/208 60/276 |
| 2015/0275730 A1 | 10/2015 | Gupta et al. |
| 2015/0276694 A1 | 10/2015 | Lahr |
| 2015/0314239 A1 | 11/2015 | Kawaguchi et al. |
| 2015/0337702 A1 | 11/2015 | Ettireddy et al. |
| 2016/0032803 A1 | 2/2016 | Ettireddy et al. |
| 2016/0186629 A1 | 6/2016 | Osburn et al. |
| 2016/0186630 A1 | 6/2016 | Osburn et al. |
| 2016/0346732 A1 | 12/2016 | Schmitt et al. |
| 2017/0051654 A1 | 2/2017 | Gupta et al. |
| 2017/0114690 A1 | 4/2017 | Gupta et al. |
| 2017/0122159 A1 | 5/2017 | Bahrami |
| 2017/0130629 A1 | 5/2017 | Nagel et al. |
| 2017/0167342 A1 | 6/2017 | Balthes |
| 2017/0175604 A1 | 6/2017 | Devarakonda et al. |
| 2017/0234199 A1 | 8/2017 | Sun et al. |
| 2017/0306819 A1 | 10/2017 | Alfieri et al. |
| 2018/0080359 A1 | 3/2018 | Price et al. |
| 2018/0087426 A1 | 3/2018 | Dou et al. |
| 2018/0163589 A1 | 6/2018 | David et al. |
| 2018/0230879 A1* | 8/2018 | Saitoh ................ F01N 3/208 |
| 2018/0252136 A1 | 9/2018 | Concetto Pesce et al. |
| 2018/0274420 A1 | 9/2018 | Kleinknecht et al. |
| 2018/0274421 A1 | 9/2018 | Smith et al. |
| 2018/0334939 A1 | 11/2018 | Mital et al. |
| 2018/0345217 A1 | 12/2018 | Goffe |
| 2018/0345218 A1 | 12/2018 | Goffe |
| 2019/0078481 A1 | 3/2019 | Schweizer |
| 2019/0155230 A1 | 5/2019 | Culbertson et al. |
| 2019/0234367 A1 | 8/2019 | Pursifull et al. |
| 2019/0345861 A1 | 11/2019 | Johansson et al. |
| 2019/0360415 A1 | 11/2019 | Romanato |
| 2019/0383189 A1 | 12/2019 | Dou et al. |
| 2020/0063634 A1 | 2/2020 | Smith et al. |
| 2020/0316571 A1 | 10/2020 | Goffe |
| 2020/0332691 A1 | 10/2020 | Soeger et al. |
| 2021/0079826 A1 | 3/2021 | Voss et al. |
| 2021/0095590 A1 | 4/2021 | Bastoreala et al. |
| 2022/0010713 A1 | 1/2022 | McCarthy, Jr. et al. |

FOREIGN PATENT DOCUMENTS

| | | |
|---|---|---|
| DE | 102018101929 A1 | 8/2019 |
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A1 | 10/2009 |
| WO | WO 2014032686 A1 | 3/2014 |

* cited by examiner

METHODS FOR DIAGNOSTICS AND OPERATION OF AN EMISSIONS AFTERTREATMENT SYSTEM

BACKGROUND

Technical Field

The present disclosure generally relates to engine emissions management, and more particularly, to engine NOx emissions management.

Description of the Related Art

Although diesel engines are known to be more economical to run than spark-ignited engines, diesel engines inherently face challenges in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Engine exhaust aftertreatment system can be utilized to reduce or eliminate emissions of these and other combustion products.

An approach is to reduce or eliminate NOx emissions is to include an additional close-coupled SCR and diesel exhaust fluid (DEF) dosing system as close to the engine as possible to take full advantage of the available thermal energy of the engine exhaust gas. The conversion efficiency of an SCR catalyst can be affected by a number of factors including aging of the catalyst, exhaust gas temperature and flow, poor quality or diluted DEF, DEF injector failure, DEF pump failure, DEF line blockages. In addition, inferring NOx conversion efficiency for a catalyst under normal operation conditions can result in variations in the inferred NOx conversion efficiency due to randomization of inlet exhaust gas conditions, such as, volumetric flow, temperature and NOx levels. Understanding the conversion efficiency of the SCR catalyst is valuable for purposes of performing diagnostics on an EAS and for purposes of controlling the operation of an EAS.

BRIEF SUMMARY

A method may be summarized as comprising: operating an engine emissions aftertreatment system (EAS) for an internal combustion engine at one or more steady-state conditions. The EAS includes a close coupled selective catalytic reduction (SCR) unit and a downstream (or underbody) SCR unit. Exhaust gas from the internal combustion chamber is flowed to the close coupled SCR unit and exhaust gas from the close coupled SCR unit is flowed to the downstream SCR unit. The downstream SCR unit is operated to reduce NOx content of the exhaust gas. Temperature at which the close coupled SCR unit is operated is adjusted to a plurality of different temperatures while maintaining other EAS operating conditions at substantially steady-state. During such steady-state operation, NOx conversion efficiency of the close coupled SCR unit is evaluated. The NOx conversion efficiency of the close coupled SCR unit at the plurality of different temperatures is recorded. Operation parameters of the EAS are adjusted based on the recorded NOx conversion efficiency of the close coupled SCR unit at the plurality of different temperatures.

Adjusting an operation parameter of the EAS based on the recorded NOx conversion efficiency of the closed coupled SCR unit at a plurality of different temperatures includes determining a difference between the recorded NOx conversion efficiency of the closed coupled SCR unit at a plurality of different temperatures and known NOx conversion efficiency for a SCR unit at the plurality of different temperatures.

A method may be summarized as comprising, evaluating NOx conversion efficiency of the close coupled SCR unit of an EAS including the close coupled SCR unit and a downstream SCR unit. The method includes operating the EAS at one or more steady-state conditions while flowing exhaust gas from the internal combustion engine through the close coupled SCR unit. Exhaust gas is flowed from the close coupled SCR unit through the downstream SCR unit and NOx content in the exhaust gas is reduced in the downstream SCR unit. The NOx conversion efficiency of the close coupled SCR unit is evaluated at a plurality of different temperatures while maintaining the EAS operating conditions at substantially steady-state. The NOx conversion efficiency of the close coupled SCR unit at the plurality of different temperatures is recorded. Performance of the close coupled SCR unit is evaluated based on the recorded NOx conversion efficiency of the close coupled SCR unit at the plurality of different temperatures.

An emissions management system for a vehicle including an internal combustion engine and an EAS that includes the close coupled SCR unit and a downstream SCR unit, may be summarized as including, at least one non-transitory processor readable storage medium that stores one of processor executable instructions or data and at least one processor communicatively coupled to the at least one non-transitory processor readable storage medium. In operation, the at least one processor receives indications of NOx conversion efficiency of the close coupled SCR unit at a plurality of temperatures and stores the received indications of NOx conversion efficiency of the close coupled SCR unit operated at a plurality of temperatures in the non-transitory processor readable storage medium. The at least one processor evaluates performance of the EAS including the received indications of NOx conversion efficiency of the close coupled SCR unit at a plurality of temperatures.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1A:
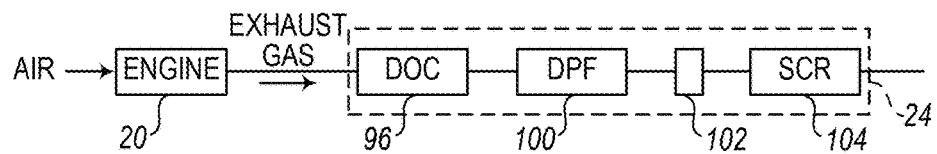
FIG. 1A is a schematic block diagram of an example of an emission aftertreatment system coupled to an internal combustion engine.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another. Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

FIG. 1A shows a block diagram providing a brief overview of a vehicle powertrain. The components include an internal combustion engine 20 in flow communication with one or more selected components of an emission aftertreatment system 24 (EAS). The illustrated emission aftertreatment system 24 includes an oxidation system 96 upstream of a particulate filter 100. In the embodiment shown, the oxidation system 96 is a diesel oxidation catalyst (DOC) 96 coupled in flow communication to receive and treat exhaust from the engine 20. The DOC 96 is preferably a flow-through device that includes either a honeycomb-like or plate-like substrate. The DOC substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flows through DOC 96 it flows into the particulate filter 100, which in the illustrated embodiment is a diesel particulate filter (DPF) 100. The DPF 100 is utilized to capture unwanted diesel particulate matter from the flow of exhaust gas exiting engine 20, by flowing exhaust across the walls of channels within DFP 100. The diesel particulate matter includes sub-micron sized solid and liquid particles found in exhaust of a diesel fueled internal combustion engine. The DPF 100 can be manufactured from a variety of materials including but not limited to cordierite, silicon carbide, and/or other high temperature oxide ceramics.

From DPF 100, treated exhaust gases proceed through a compartment in fluid communication with a diesel exhaust fluid (DEF) doser 102 for the introduction of a reductant, such as ammonia or a urea solution into the exhaust gases. The exhaust gases and reductant then flow to a selective catalytic reduction (SCR) system or unit 104 which includes a catalytic core having a selective catalytic reduction catalyst (SCR catalyst) loaded thereon. System 24 can include one or more sensors (not illustrated) associated with components of the system 24, such as one or more temperature sensors, $NO_x$ sensors, $NH_3$ sensors, oxygen sensors, mass flow sensors, volumetric flow sensors, particulate sensors, and a pressure sensors.

As discussed above, the emission aftertreatment system 24 includes a Selective Catalytic Reduction (SCR) system 104. The SCR system 104 includes a selective catalytic reduction catalyst which interacts with $NO_x$ gases to convert the $NO_x$ gases into $N_2$ and water, in the presence of an ammonia reductant. The overall reactions of $NO_x$ reductions in SCR are shown below.

$$4NO + 4NH_3 + O_2 \rightarrow 4N_2 + 6H_2O \qquad (1)$$

$$6NO_2 + 8NH_3 \rightarrow 7N_2 + 12H_2O \qquad (2)$$

$$2NH_3 + NO + NO_2 \rightarrow 2N_2 + 3H_2O \qquad (3)$$

Where Equation (1) represents a standard SCR reaction and Equation (3) represents a fast SCR reaction.

Figure 1B:
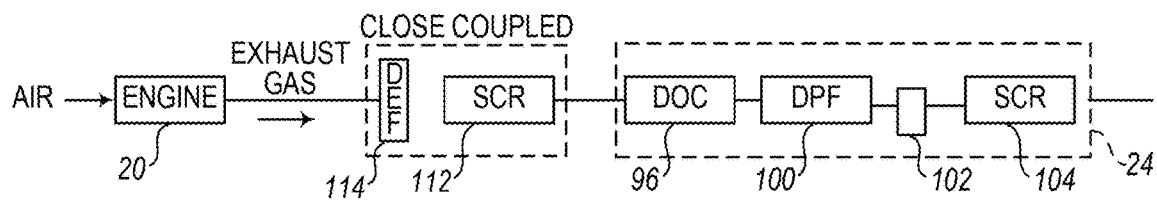
FIG. 1B is a schematic block diagram of an example of an emission aftertreatment system with a close coupled selective catalytic reduction unit coupled to an internal combustion engine.

Referring to FIG. 1B, some EAS include a "close-coupled SCR" or "upstream SCR" 112 associated with a DEF doser 114 located upstream of the close-coupled SCR 112. The close-coupled SCR 112 is located closer to the engine 20 than the downstream SCR 104 (sometimes referred to as an under-body SCR) and in some embodiments as close to the engine as possible. An example of a close-coupled SCR 104 configuration is illustrated in FIG. 1B. Such close-coupled SCR configuration employs dual DEF dosers 102 and 114 (one upstream of the close-coupled SCR 112 and one upstream of the downstream SCR 104 and below the close-coupled SCR 112.

Figure 1C:
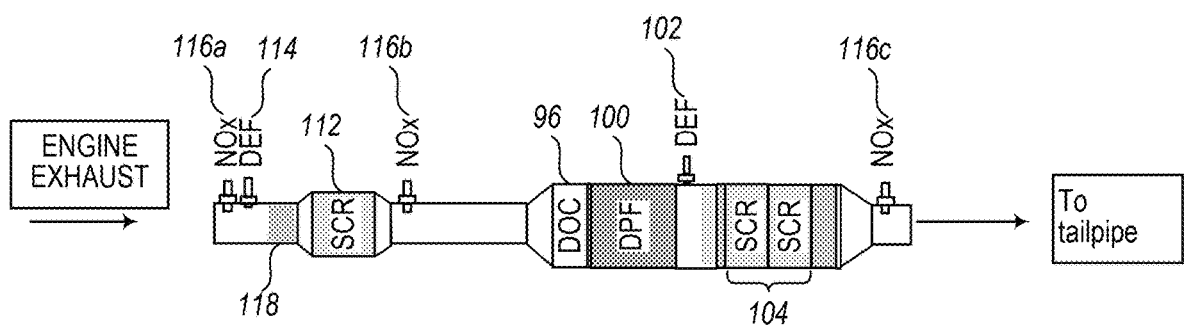
FIG. 1C is a schematic diagram of an example of an emission aftertreatment system with a close coupled selective catalytic reduction unit coupled to an internal combustion engine including a plurality of sensors, according to one non-limiting illustrated embodiment.

FIG. 1C illustrates an example of the EAS described above with reference to FIG. 1B. In FIG. 1C, the same reference numbers as used in FIG. 1B are used to identify identical features illustrated in FIG. 1C. For example, EAS illustrated in FIG. 1C includes first DEF doser 114, upstream SCR unit 112, diesel oxidation catalyst unit 96, diesel particulate filter 100, second DEF doser 102 and downstream SCR unit 104. In the embodiment illustrated in FIG. 1C, downstream SCR 104 is illustrated as included two bricks of substrates supporting SCR catalyst(s). EAS illustrated in FIG. 1C further includes a plurality of NOx sensors 116. A NOx sensor 116a is located upstream of DEF doser 114. NOx sensor 116b is located downstream of upstream SCR 112 which is upstream of downstream SCR 104. NOx sensor 116c is positioned downstream of downstream SCR 104. Such NOx sensors are designed to detect concentrations of NOx in the exhaust gas; however, such NOx sensors used in EAS are often unable to differentiate between NOx in the exhaust gas and ammonia in the exhaust gas. Accordingly, signals generated by the NOx sensors are an indication of the concentration or amount of NOx and ammonia in the exhaust gas the sensor is interrogating. In the embodiment illustrated in FIG. 1C, the EAS includes a thermal input device 118, e.g., an electric heater downstream of DEF doser 114 and upstream of SCR 112. This thermal input device is used, to introduce thermal energy into the exhaust gas, thereby increasing the temperature of the exhaust gas flowing into the close coupled SCR unit 112. The temperature of the exhaust gas flowing into the close coupled SCR unit 112 can also be adjusted through the implementation of an exhaust gas recirculation system which recirculates a portion of the exhaust gas to the internal combustion engine. Adjusting the temperature of the exhaust gas flow into the close coupled SCR unit 112 is one way to adjust the temperature of the catalyst in the SCR unit 112. While the embodiment of an EAS illustrated in FIG. 1C includes two SCR units 112 and 104, embodiments of the present disclosure include an EAS that includes more than two SCR units and methods in accordance with embodiments of the present disclosure can be practiced in an EAS that includes two or more SCR units.

In accordance with an embodiment of the present disclosure, NOx conversion efficiency of a close coupled SCR unit in an EAS that includes the close coupled SCR unit and a downstream (or underbody) SCR unit is evaluated intrusively, i.e., while the internal combustion engine and EAS operably connected to the internal combustion engine is operating. NOx conversion efficiency represents the ability of catalyst in an SCR unit to convert NOx into desired reaction products, such as water and nitrogen gas. NOx conversion efficiency is determined by subtracting the amount of NOx in exhaust gas exiting the close coupled SCR unit from the amount of NOx entering the close coupled SCR unit and dividing the difference by the amount of NOx entering the close coupled SCR unit. In accordance with some embodiments described herein, NOx conversion efficiency of a close coupled SCR unit is evaluated at a plurality of different temperatures at which the close coupled SCR unit is operated during substantially steady state EAS operating conditions. The resulting NOx conversion efficiency values at the plurality of different temperatures are used to evaluate performance (e.g., perform a diagnostic) of the close coupled SCR unit. In accordance with other embodiments of the present disclosure, the results of the evaluation of NOx conversion efficiency of the close coupled SCR unit are used to control operation of the EAS including the close coupled SCR unit, (e.g., adjusting operation parameters of the EAS).

Figure 2:
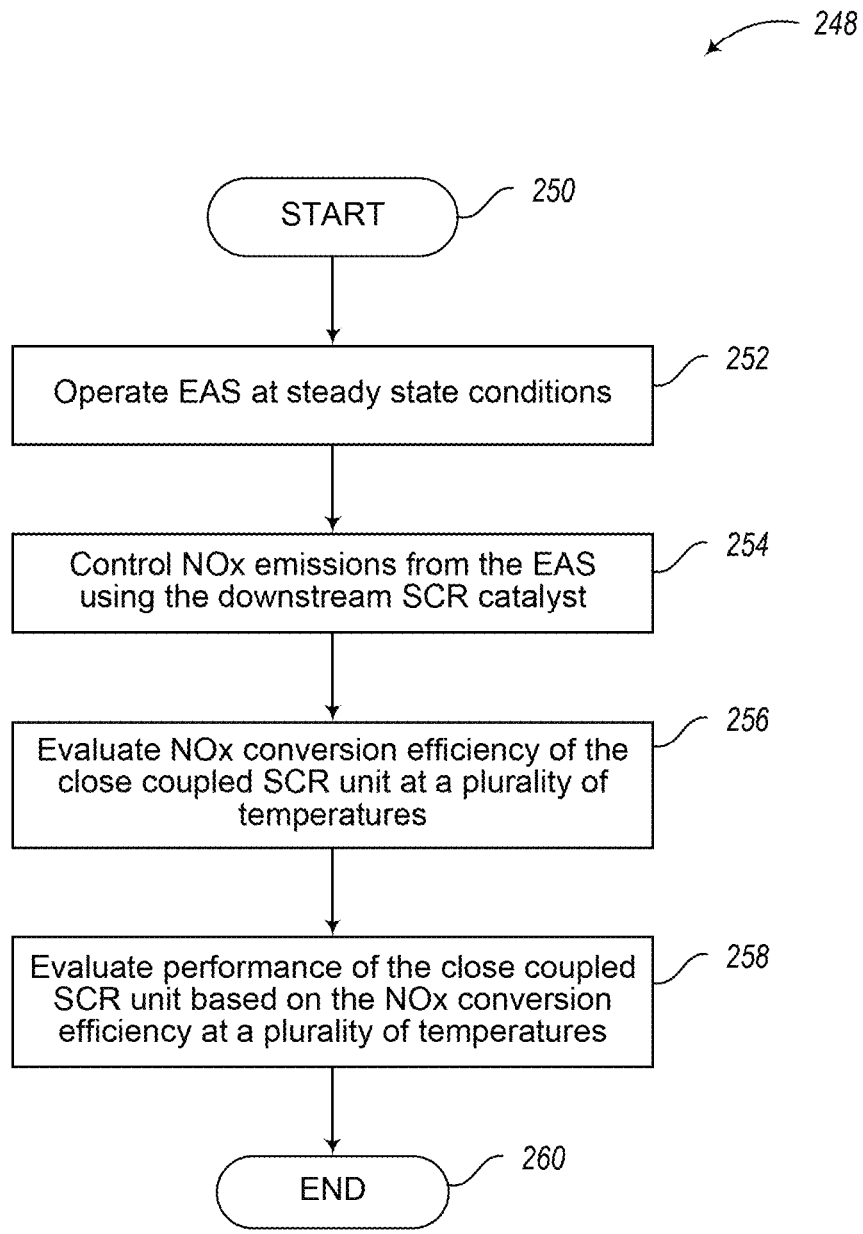
FIG. 2 is a flow diagram of a method of evaluating NOx conversion efficiency of a close-coupled SCR unit, according to one non-limiting illustrated embodiment.

Referring to FIGS. 2, 1B and 1C, in accordance with an embodiment of the present disclosure, a method 248 of evaluating NOx conversion efficiency of a close coupled SCR unit of an EAS including the close coupled SCR unit and a downstream SCR unit starts at step 250. In accordance with method 248, at step 252 the EAS is operated at one or more steady state conditions. Steady-state conditions of the EAS include one or more of a substantially constant temperature of the close coupled SCR unit 112, a substantially constant volumetric flow of exhaust gas through the close coupled SCR 112, a substantially constant NOx content of the exhaust gas flowing to the close coupled SCR unit 112. Embodiments in accordance with the present disclosure are not limited to the foregoing described steady-state conditions of the EAS. Embodiments in accordance with the present disclosure include those that evaluate NOx conversion efficiency of the close coupled SCR unit of an EAS at one or more steady-state conditions other than those expressly described above. In some embodiments, the reference to a substantially constant temperature of the close coupled SCR unit 112 refers to a temperature of a catalyst bed within the close coupled SCR unit 112. In some embodiments, the temperature of a catalyst bed within the close coupled SCR unit 112 is a mid-bed temperature of the catalyst within the close coupled SCR unit 112. In some embodiments, a mid-bed temperature is determined by averaging the temperature of the exhaust gas into close coupled SCR unit 112 and the temperature of the exhaust gas exiting the close coupled SCR unit 112. Embodiments in accordance with the present disclosure are not limited to determining NOx conversion efficiency of the close coupled SCR unit 112 at a plurality of mid-bed temperatures. In other embodiments in accordance with the present disclosure, NOx conversion efficiency of the close coupled SCR unit 112 is determined at a plurality of temperatures other than a plurality mid-bed temperatures. For example, in some embodiments, NOx conversion efficiency of the close coupled SCR unit is determined at a plurality of temperatures of the exhaust gas entering the close coupled SCR unit 112 or at a plurality of temperatures of the exhaust gas exiting the close coupled SCR unit 112.

As used herein with reference to the internal combustion engine 20, steady-state conditions, refers to: one or more of substantially constant RPM, substantially constant load, substantially constant exhaust gas temperature, substantially constant volumetric flow of exhaust gas and substantially constant NOx concentration. The internal combustion engine steady-state conditions and the EAS steady-state conditions are not limited to those recited above and can include other operating conditions of the EAS and the internal combustion engine that are held steady during NOx conversion efficiency of the SCR unit 112 determinations in accordance with embodiments of the present disclosure. The term "substantially constant" as used herein, refers a variance of less than 15% above or below the average value of the variable during the period in question. For example, an exhaust gas temperature would be "substantially constant" when the exhaust gas temperature is between 85% and 115% of the average temperature of the exhaust gas at the measurement point (e.g., exiting the internal combustion engine or entering the close coupled SCR unit) during the period in question. The term "constant" as used herein, refers to the variable in question being within 5% of the average value of the variable during the period in question. For example, an exhaust gas temperature would be "constant" when the exhaust gas temperature is between 95% and 105% of the average temperature of the exhaust gas (e.g., exiting the internal combustion engine or entering the close coupled SCR unit) during the period in question.

In accordance with method 248, during operation of the EAS at one or more steady state conditions, at step 254, NOx emissions from the EAS are controlled to be within prescribed limits by the downstream SCR (104 in FIG. 1C).

At step 256, as described in more detail below with reference to FIG. 3, method 248 evaluates NOx conversion efficiency of the close coupled SCR unit 112 at a plurality of temperatures at which the close coupled SCR unit is operated. At step 258, in accordance with some embodiments of the present disclosure, performance of the close coupled SCR unit 112 is evaluated based on the NOx conversion efficiency of the close coupled SCR unit 112 at the plurality of different temperatures as described below in more detail with reference to FIG. 3. The method illustrated in FIG. 2, ends at step 260.

Figure 3:
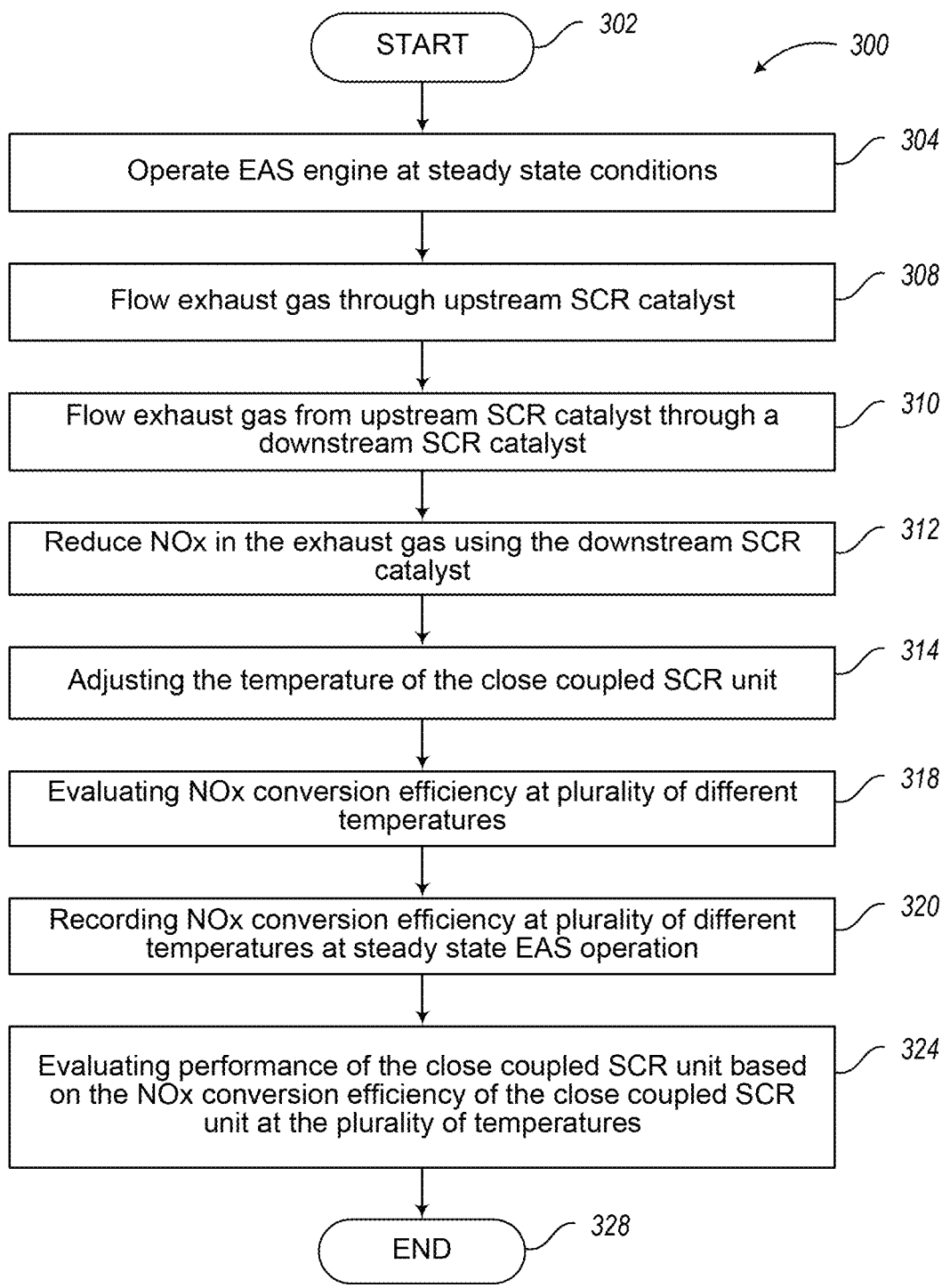
FIG. 3 is a flow diagram of a method of evaluating NOx conversion efficiency of a close-coupled SCR unit, according to one non-limiting illustrated embodiment.

Referring to FIGS. 3, 1B and 1C, a method 300 of evaluating NOx conversion efficiency of a close coupled SCR unit 112 of an EAS including the close coupled SCR unit 112 and a downstream SCR unit 104 in accordance with a disclosed embodiment is illustrated. Method 300 starts at step 302. Step 304, is similar to step 252 described above with reference to FIG. 2. Step 304 includes operating an EAS (including at least a close-coupled SCR 112 and a downstream SCR 104) operably connected to an internal combustion engine 20 at one or more substantially steady-state conditions. During operation of the EAS at one or more substantially steady-state conditions, diesel exhaust fluid from DEF doser 114 is dosed into the exhaust gas from the internal combustion engine 20 that is flowing through the EAS. The diesel exhaust fluid is dosed into the exhaust gas upstream of the close coupled SCR 112 unit. The exhaust gas, including the dosed DEF is received by the close coupled SCR unit 112 at step 308. At step 310 exhaust gas from the close coupled SCR 112 flows to the downstream SCR unit 104. In accordance with the disclosed embodiment of FIG. 3, at step 312, emission of NOx from EAS is controlled by the downstream SCR unit 104 by reducing the amount of NOx content of the exhaust gas entering downstream SCR unit 104. In some embodiments, downstream SCR unit 104 controls NOx emissions to from the EAS to within prescribed regulatory limits. At step 314, temperature at which the close coupled SCR unit 112 operates is adjusted by varying the temperature of the exhaust gas entering close coupled SCR unit 112. The temperature of the exhaust gas entering the close coupled SCR unit is varied in a number of different ways. In some embodiments, thermal energy is introduced into the exhaust gas from a source of thermal energy, such as heater 118. Heater 118 is an electrically powered heater or is a heater powered by a nonelectrical energy source. In other embodiments, temperature of the exhaust gas entering the close coupled SCR unit 112 is adjusted by changing the operation parameters of the internal combustion engine 20, e.g., adjusting engine braking, adjusting load on the engine, adjusting level of exhaust gas recirculation, adjusting air to fuel ratio, adjusting temperature of air fed to engine or any other techniques that results in an increase in the temperature of the exhaust gas exiting the internal combustion engine 20.

Figure 8:
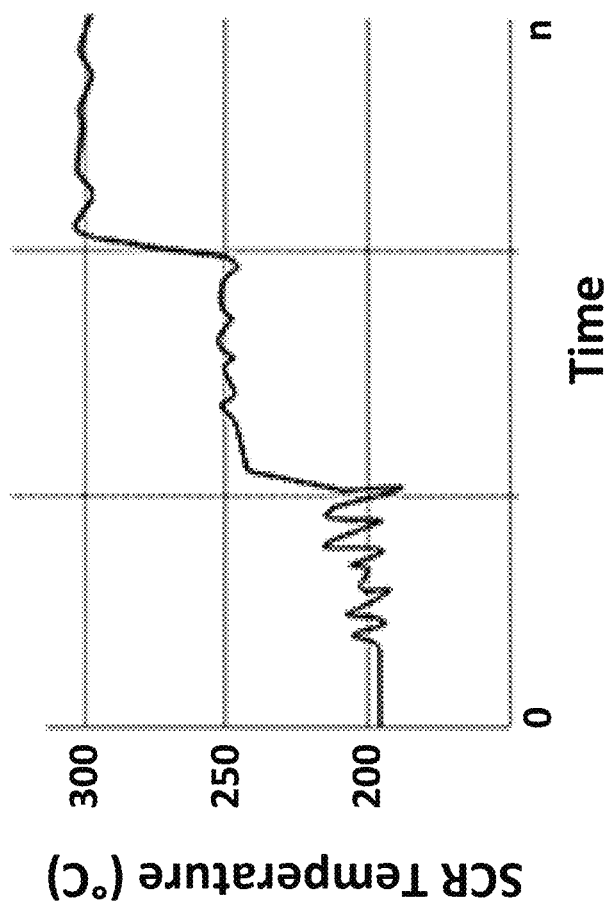
FIG. 8 illustrates varying temperatures from about 200° C. to 300° C. of a close coupled SCR unit in accordance with some embodiments disclosed herein.
Figure 9:
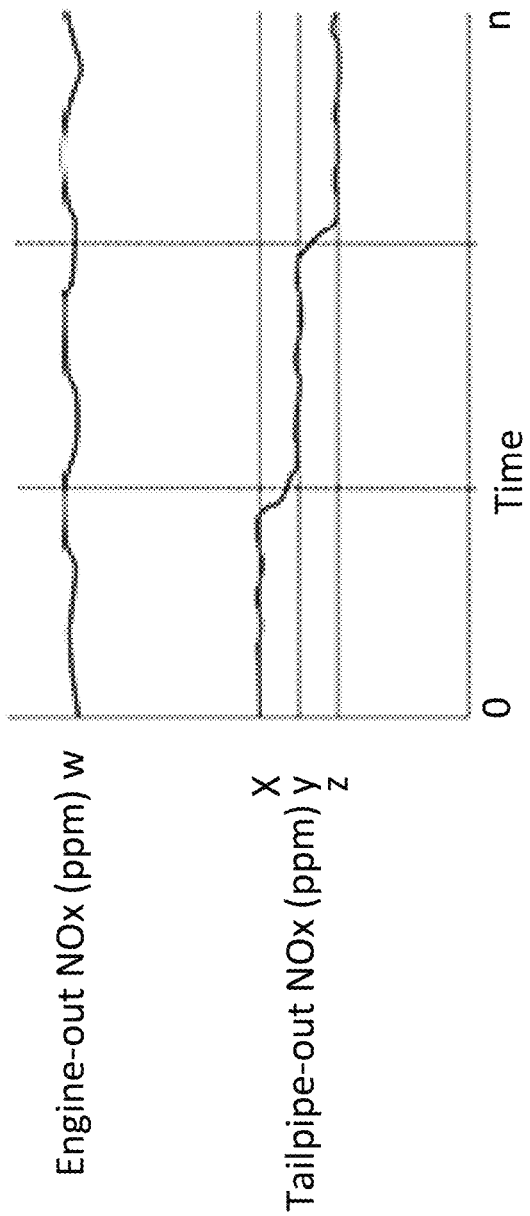
FIG. 9 illustrates engine out NOx in ppm and tailpipe out NOx in ppm for an EAS as a function of varying temperature of the close coupled SCR unit as illustrated in FIG. 8.

In one embodiment, adjusting the temperature of the close coupled SCR unit 112 includes adjusting the temperature so that it operates at a plurality of different temperatures. Referring to FIG. 8, an example of adjusting the temperature of the close coupled SCR unit 112 is illustrated. In FIG. 8, the temperature of the close coupled SCR unit 112 is adjusted from about 200° C. to 300° C. in stepwise increments over a time period of zero to n minutes. In the embodiment illustrated in FIG. 8, stepwise increments are about 50° C. In other embodiments in accordance with the present disclosure, the stepwise increments can be greater than or less than 50° C. For example, the stepwise temperature increments can be about 10° C., 20° C., 30° C., 40° C., 60° C., 70° C., 80° C., 90° C. or 100° C. At step 318, NOx conversion efficiency of the close coupled SCR unit 112 is evaluated at each of the plurality of different temperatures at which the close coupled SCR unit 112 is operated, while the EAS is operated in otherwise substantially steady-state conditions. For example, in step 318, when the NOx content of the exhaust gas upstream of close coupled SCR unit 112 is determined by NOx sensor 116a and the NOx content of the exhaust gas downstream of the close coupled SCR unit 112 is determined by NOx sensor 116b at the plurality of different temperatures, the volume of exhaust gas flowing and the amount of DEF dosing is substantially constant, e.g., a substantially constant ANR. NOx conversion efficiency of the close coupled SCR unit 112 is determined from the NOx content of the exhaust gas entering the close coupled SCR unit 112 and the NOx content of the exhaust gas exiting the close coupled SCR unit 112 as described above. FIG. 9 illustrates an effect on NOx conversion efficiency of operating the close coupled SCR unit 112 at the plurality of different temperatures illustrated in FIG. 8. FIG. 9 illustrates that the NOx conversion efficiency of the close coupled SCR unit 112 increases as the temperature at which the close coupled SCR unit 112 is operated increases. This increase in NOx conversion efficiency of the close coupled SCR unit 112 is evidenced in FIG. 9 by a decrease in Tailpipe-out NOx (ppm) concentration as the temperature at which the close coupled SCR unit 112 is operated increases from about 200° C. to about 300° C. In accordance with the method 300, the evaluated NOx conversion efficiencies at the plurality of different temperatures are recorded at step 320.

In accordance with the embodiment of FIG. 3, at step 324 performance of the close coupled SCR unit 112 based on the NOx conversion efficiency of the close coupled SCR unit 112 at the plurality of temperatures is evaluated. In accordance with one embodiment of the present disclosure, performance of close coupled SCR unit 112 is evaluated by determining a difference between the recorded NOx conversion efficiency at the plurality of different temperatures for the close coupled SCR unit 112 being evaluated to known NOx conversion efficiency of a SCR unit at the plurality of different temperatures at which the NOx conversion efficiency of the close coupled SCR unit 112 was determined. In accordance with some embodiments, the known NOx conversion efficiency of a SCR unit at the plurality of different temperatures is based on previously determined conversion efficiency of an SCR catalyst unit including the same volume and type of catalyst as the close coupled SCR unit 112 under evaluation and which was operated at an ammonia to NOx ratio (ANR) substantially equal to the ANR at which the close coupled SCR unit 112 was operating when the NOx conversion efficiency of the close coupled SCR unit 112 was determined. In accordance with some embodiments of the present disclosure, the known NOx conversion efficiency at the plurality of different temperatures is previously determined using an SCR catalyst unit including the same volume and type of catalyst as used in the close coupled SCR unit 112 under evaluation and operated at substantially the same ANR as the close coupled SCR unit 112 under evaluation, and in addition, the catalyst of the SCR unit has been aged to approximate the age of the catalyst in the close coupled SCR unit 112 under evaluation. Such aging of the catalyst can be achieved by exposing the catalyst to elevated temperatures for extended periods of time. In one embodiment, the known NOx conversion efficiency of a SCR unit including the same volume and type of catalyst as the close coupled SCR unit 112 under evaluation is determined on a bench testing unit. Embodiments in accordance with the present disclosure are not limited to determining the known NOx conversion efficiency on a bench testing unit. For example, in some embodiments, the known NOx conversion efficiency is determined by means other than a bench testing unit, e.g., from monitoring the NOx conversion efficiency at a plurality of temperatures of an SCR unit in a real world installation, e.g., on a vehicle.

Figure 10:
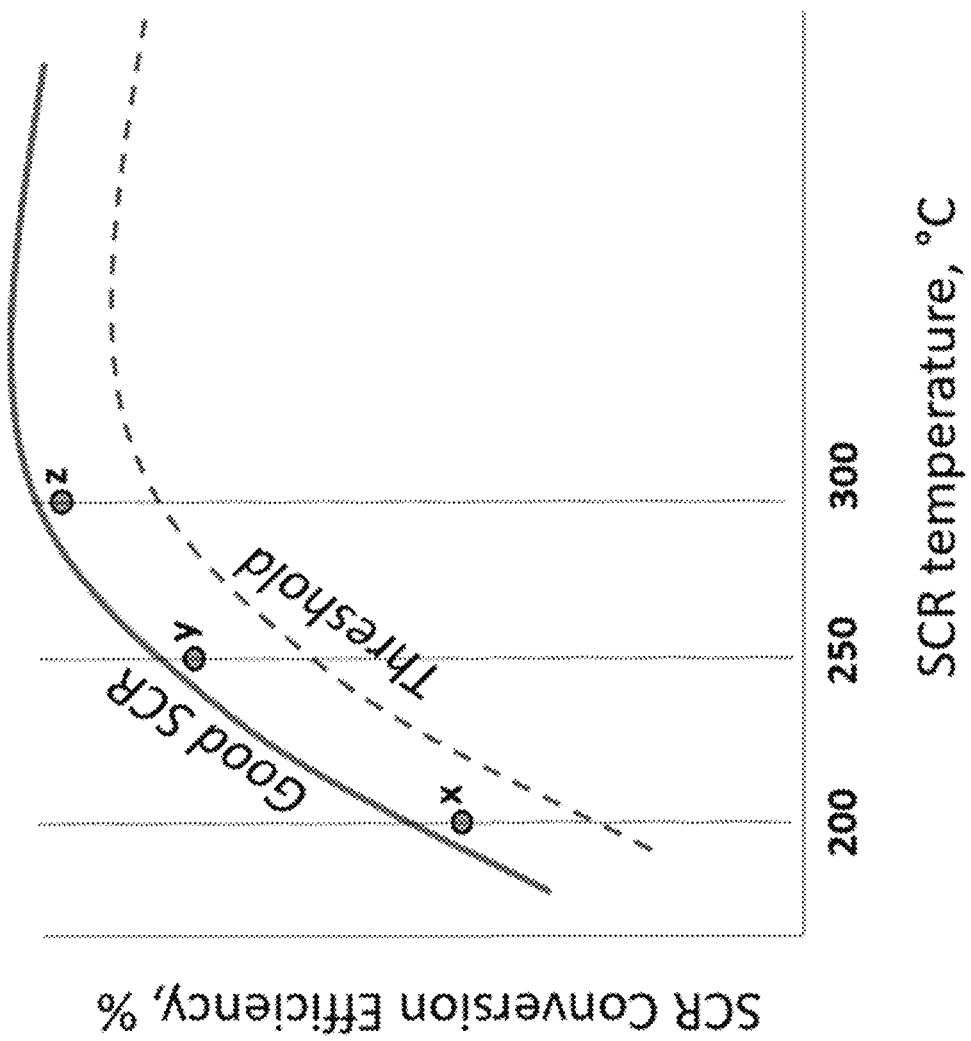
FIG. 10 illustrates SCR conversion efficiency for a close coupled SCR unit and SCR conversion efficiency for another SCR unit.

In accordance with an embodiment of the present disclosure, the known NOx conversion efficiencies at a plurality of temperatures are stored in a lookup table as a function of age of the catalyst. The age variable in the lookup table can be hours of operation of SCR unit 112, volume of exhaust gas treated by close coupled SCR unit 112, miles traveled with the internal combustion engine operating at an RPM above idling RPMs or some other measure of catalyst age. An example of a known NOx conversion efficiency for an SCR unit is illustrated in FIG. 10 as the plot of "Good SCR". FIG. 10 also reflects a "Threshold" plot of SCR NOx conversion efficiency versus temperature (broken line), which reflects a predetermined % variance from the Good SCR NOx conversion efficiency curve at a plurality of temperatures. Examples of the predetermined % variance can range from about 0.5 to 10%; however, embodiments in accordance with the present disclosure are not limited to this range of predetermined percent variance. Embodiments in accordance with the present invention can utilize a predetermined percent variance that is less than 0.5% or greater than 10%. FIG. 10 also reflects the SCR NOx conversion efficiencies X, Y and Z for the close coupled SCR unit 112 at temperatures of 200° C., 250° C. and 300° C. (X, Y and Z, respectively) from FIG. 9. In accordance with embodiments of the present disclosure, performance of the close coupled SCR unit 112 under evaluation is evaluated by determining a difference between one or more of the determined NOx conversion efficiencies X, Y and Z and either the conversion efficiency of the "Good SCR" at the particular temperatures or the "Threshold" conversion efficiency at the particular temperatures. For example, in accordance with embodiments of the present disclosure, one or more of the NOx conversion efficiencies X, Y or Z falling below the Threshold NOx conversion efficiency in FIG. 10 would be an indication of a malfunction of the close coupled SCR unit 112 or some other component of the EAS, e.g., DEF doser. Under such circumstances, a diagnostic signal may be generated by control system 110 in FIG. 6. In accordance with some embodiments of the present disclosure, determination of whether a diagnostic signal will be generated is based on a determination that more than one, e.g., a plurality of NOx conversion efficiency values at a plurality of different temperatures for the close coupled SCR unit 112, varies from the GOOD SCR NOx conversion efficiencies or the Threshold NOx conversion efficiencies by a predetermined amount. Utilizing a plurality of NOx conversion efficiencies at a plurality of different temperatures for purposes of evaluating performance of close coupled SCR unit 112 provides a more robust diagnostic of the close coupled SCR unit 112 compared to basing diagnosis on NOx conversion efficiency at a specific single temperature. Method 300 ends at step 328.

Figure 4:
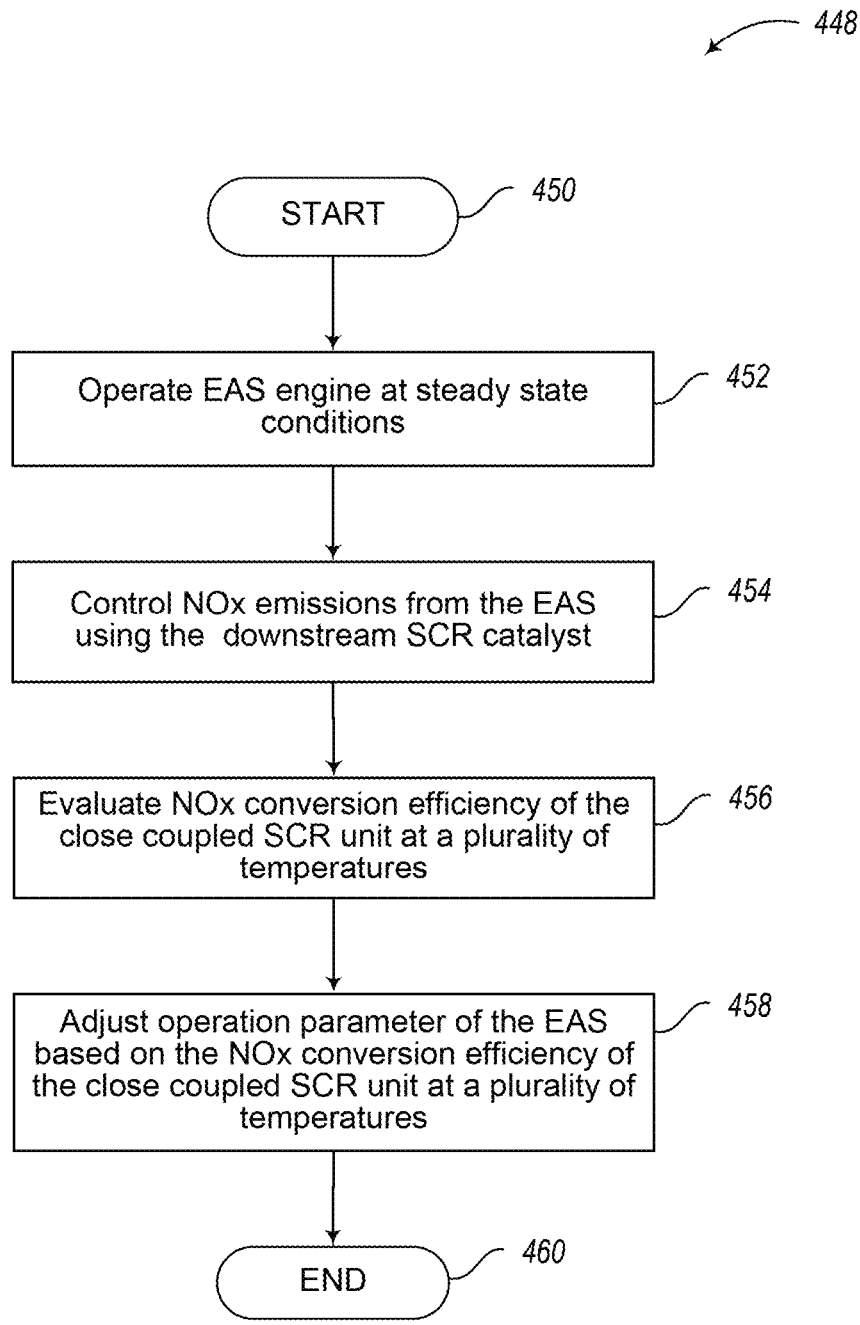
FIG. 4 is a flow diagram of a method of controlling an emission aftertreatment system that includes two or more SCR units, according to one non-limiting illustrated embodiment.

Referring to FIGS. 1B, 1C and 4, a method 448 of controlling an emission aftertreatment system (EAS) that includes two or more selective catalytic reduction units in accordance with embodiments of the present disclosure is illustrated. Method 448 starts at step 450 and includes step 452 of operating an EAS at one or more steady state conditions. Example of EAS steady-state conditions have been described above, and will not be repeated here in the interest of brevity. Controlling NOx emissions from the EAS using the close coupled SCR unit 112 at step 454 and evaluating NOx conversion efficiency of the close coupled SCR unit 112 at a plurality of temperatures at step 456 is similar to steps 252 and 254 described above with reference to FIG. 2 and will not be described in more detail here in the interest of brevity. In accordance with the embodiment of FIG. 4, at step 458, one or more operation parameters of the EAS or internal combustion engine 20 are adjusted based on the results of the evaluation of NOx conversion efficiency of the close coupled SCR unit 112 at a plurality of temperatures. Examples of such one or more operation parameters of the EAS or internal combustion engine 20 include dosing rate of diesel exhaust fluid to an upstream SCR catalyst unit, dosing rate of diesel exhaust fluid to a downstream SCR catalyst unit, temperature of the upstream SCR catalyst unit and temperature of the downstream SCR catalyst unit, load on the internal combustion engine, temperature of exhaust gas from the internal combustion engine and volumetric flow of air through the internal combustion engine, volumetric flow rate of exhaust gases, volumetric flow of air to the engine, fuel/air ratio to engine, temperature of air flow to engine, NOx content of the exhaust gas from engine, NOx content of exhaust gas exiting an SCR unit, temperature of the engine, an operating speed of the internal combustion engine 102 (e.g., in RPM) and level of exhaust gas recirculation (EGR). Embodiments in accordance with the present disclosure are not limited to the foregoing operational parameters. Operational parameters of the internal combustion engine or the EAS in addition to those expressly listed above can be adjusted in accordance with the present disclosure.

Figure 5:
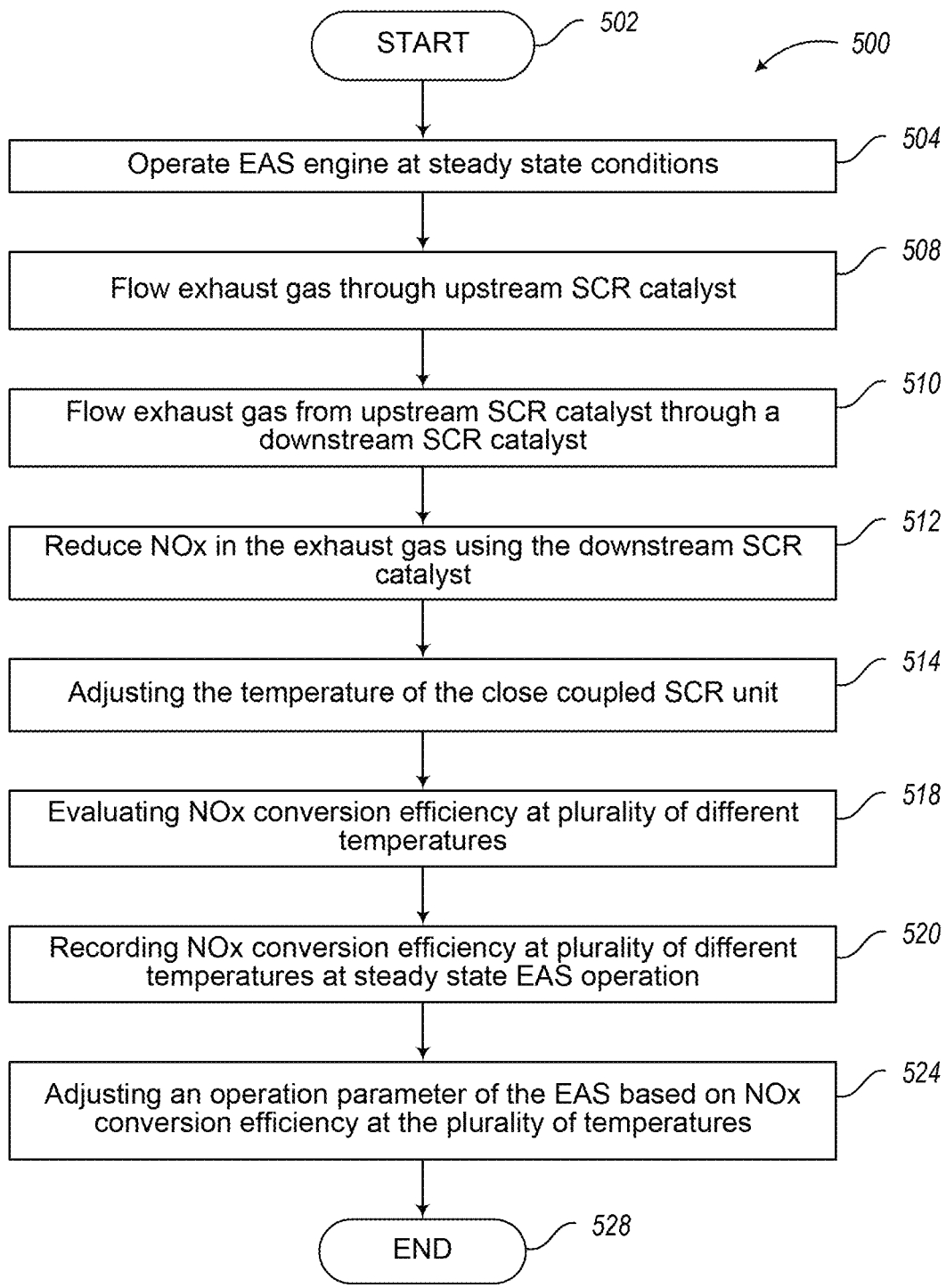
FIG. 5 is a flow diagram of a method of controlling an emission aftertreatment system that includes two or more SCR units, according to one non-limiting illustrated embodiment.

Referring to FIGS. 1B, 1C and 5, a method of controlling operation of an EAS in accordance with another embodiment of the present disclosure is illustrated. In FIG. 5, a method 500 of controlling an internal combustion engine emissions aftertreatment system (EAS), including a close coupled SCR unit 112 and a downstream SCR unit 104 in accordance with a disclosed embodiment is illustrated. Method 500 starts at step 502. Steps 504, 508, 510, 512, 514, 518 and 520 are similar to steps 304, 308, 310, 312, 314, 318 are 320 described above with reference to FIG. 3. Step 504 includes operating an EAS (including at least a close-coupled SCR 112 and a downstream SCR 104) operably connected to an internal combustion engine, at one or more substantially steady-state conditions. During operation of the EAS at one or more substantially steady-state conditions, diesel exhaust fluid from DEF doser 114 is dosed into the exhaust gas from internal combustion engine 20 that is flowing through the EAS. The diesel exhaust fluid is dosed into the exhaust gas upstream of the close coupled SCR unit 112. The exhaust gas and the dosed DEF is received by the close coupled SCR unit 112 at step 508. At step 510 exhaust gas from the close coupled SCR 112 flows to the downstream SCR unit 104. In accordance with the disclosed embodiment of FIG. 5, at step 512, NOx content of the exhaust gas is reduced in the downstream SCR unit 104. In some embodiments, downstream SCR unit 104 controls NOx content of the exhaust emitted from downstream SCR unit 104 to within prescribed regulatory limits. At step 514, temperature at which the close coupled SCR unit 112 operates (e.g., the mid-bed temperature of the catalyst bed in the close coupled SCR unit 112) is adjusted by varying the temperature of the exhaust gas entering close coupled SCR unit 112. The temperature of the exhaust gas entering the close coupled SCR unit can be varied in a number of different ways. In some embodiments, thermal energy is introduced into the exhaust gas from a source of thermal energy, such as heater 118. Heater 118 can be electrically powered or can be powered by a nonelectrical energy source. In other embodiments, temperature of the exhaust gas entering the close coupled SCR unit 112 is adjusted by changing the operation parameters of the internal combustion engine 20, e.g., by adjusting engine braking, adjusting load on the engine, adjusting level of exhaust gas recirculation, adjusting air to fuel ratio, adjusting temperature of air fed to engine or any other techniques for adjusting the temperature of the exhaust gas exiting the internal combustion engine 20.

In one embodiment, adjusting the temperature of the close coupled SCR unit 112 includes adjusting the temperature so that the close coupled SCR unit operates at a plurality of different temperatures. Referring to FIG. 8, an example of adjusting the temperature of the close coupled SCR unit 112 in accordance with the embodiment of FIG. 4 is illustrated. The adjustment of the temperature of the close coupled SCR unit 112 illustrated in FIG. 8 has been described above and is not repeated here in the interest of brevity. In the context of the embodiment of FIG. 4, FIG. 9 illustrates that the NOx conversion efficiency of the close coupled SCR unit 112 increases as the temperature at which the close coupled SCR unit 112 is operated. This increase conversion efficiency is evidenced in FIG. 9 by a decrease in Tailpipe NOx (ppm) concentration as the temperature at which the close coupled SCR unit 1122 is operated increases. In accordance with the method 500, the evaluated NOx conversion efficiencies at the plurality of different temperatures are recorded at step 520.

In accordance with the embodiment of FIG. 5, at step 524, one or more operation parameters of the EAS or internal combustion engine 20 are adjusted based on the results of the evaluation of NOx conversion efficiency of the close coupled SCR unit at a plurality of temperatures. Examples of such one or more operation parameters of the EAS or internal combustion engine include dosing rate of diesel exhaust fluid to an upstream SCR catalyst unit, dosing rate of diesel exhaust fluid to a downstream SCR catalyst unit, temperature of the upstream SCR catalyst unit and temperature of the downstream SCR catalyst unit, load on the internal combustion engine, temperature of exhaust gas from the internal combustion engine and volumetric flow of air through the internal combustion engine, volumetric flow rate of exhaust gases, volumetric flow of air to the engine, air/fuel/ratio to engine, temperature of air flow to the engine, NOx content of the exhaust gas from engine, NOx content of exhaust gas exiting an SCR unit, temperature of the engine, an operating speed of the internal combustion engine 20 (e.g., in RPM) and level of exhaust gas recirculation (EGR). Embodiments in accordance with the present disclosure are not limited to the foregoing operational parameters. Operational parameters of the internal combustion engine or the EAS in addition to those expressly listed above can be adjusted in accordance with the present disclosure.

In accordance with the embodiment of FIG. 5, at step 524, operation parameters of the EAS or internal combustion engine 20 operably connected to the EAS are adjusted based on the results of the evaluation of NOx conversion efficiency of the close coupled SCR unit 112 at the plurality of temperatures in accordance with an embodiment of the present disclosure. In accordance with one embodiment of the present disclosure, operation parameters of the EAS or the internal combustion engine 20 operably connected to the EAS are adjusted based on a determination of a difference between the recorded NOx conversion efficiency at the plurality of different temperatures for the close coupled SCR unit 112 being evaluated to known NOx conversion efficiency of a SCR unit at the plurality of different temperatures at which the NOx conversion efficiency of the close coupled SCR unit 112 was determined. In accordance with some embodiments, the known NOx conversion efficiency of a SCR unit at the plurality of different temperatures is based on previously determined conversion efficiency of an SCR catalyst unit including the same volume and type of catalyst as the close coupled SCR unit 112 under evaluation and which was operated at an ammonia to NOx ratio (ANR) substantially equal to the ANR at which the close coupled SCR unit 112 under evaluation was operated when the NOx conversion efficiency of the close coupled SCR unit 112 was determined. In accordance with some embodiments of the present disclosure, the known NOx conversion efficiency at the plurality of different temperatures is previously determined using an SCR catalyst unit including the same volume and type of catalyst as the close coupled SCR unit 112 under evaluation and operated at substantially the same ANR as the close coupled SCR unit 112 under evaluation, and in addition, the catalyst of the SCR unit has been aged to approximate the age of the catalyst in the close coupled SCR unit 112 under evaluation. Such aging of the catalyst can be achieved by exposing the catalyst to elevated temperatures for extended periods of time. In one embodiment, the known NOx conversion efficiency of a SCR unit including the same volume and type of catalyst as the close coupled SCR unit 112 under evaluation is determined on a bench testing unit. Embodiments in accordance with the present disclosure are not limited to determining the known NOx conversion efficiency on a bench testing unit. For example, in some embodiments, the known NOx conversion efficiency is determined by means other than a bench testing unit, e.g., from monitoring the NOx conversion efficiency at a plurality of temperatures of an SCR unit in a real world installation, e.g., on a vehicle.

In accordance with the embodiment of FIG. 4, the known NOx conversion efficiencies at a plurality of temperatures are stored in a lookup table as a function of age of the catalyst. The age variable in the lookup table can be hours of operation of close coupled SCR unit 112, volume of exhaust gas treated by close coupled SCR unit 112, miles traveled with the internal combustion engine operating at an RPM above idling RPMs or some other measure of catalyst age. An example of a known NOx conversion efficiency for an SCR unit is illustrated in FIG. 10 as the plot of "Good SCR". As described above, FIG. 10 also reflects a "Threshold" plot of SCR NOx conversion efficiency versus temperature (broken line), which reflects a predetermined % variance from the Good SCR conversion efficiency curve at a plurality of temperatures. Examples of the predetermined % variance can range from about 0.5 to 10%; however, embodiments in accordance with the present disclosure are not limited to this range of predetermined percent variance. Embodiments in accordance with the present invention utilize a predetermined percent variance that is less than 0.5% or greater than 10%. FIG. 10 also reflects the SCR NOx conversion efficiencies X, Y and Z for the close coupled SCR unit 112 at temperatures of 200° C., 250° C. and 300° C. (X, Y and Z, respectively) from FIG. 9. In accordance with embodiments of the present disclosure, one or more operation parameters of the EAS or the internal combustion engine operably connected to the EAS are adjusted based on the difference between one or more of the determined NOx conversion efficiencies X, Y and Z and either the NOx conversion efficiency of the "Good SCR" at the particular temperatures or the "Threshold" NOx conversion efficiency at the particular temperatures. For example, in accordance with embodiments of the present disclosure, one or more operation parameters of the EAS or internal combustion engine connected to the EAS are adjusted based on one or more of the NOx conversion efficiencies X, Y or Z falling below the Threshold NOx conversion efficiency in FIG. 10. Examples of such one or more operation parameters of the EAS or an internal combustion engine connected to the EAS have been described above in are not reproduced here in the interest of brevity. In accordance with one or more embodiments described herein, utilizing a plurality of NOx conversion efficiencies at a plurality different temperatures for the close coupled SCR unit 112 provides a more robust input to adjust one or more operation parameters of an EAS (including the close coupled SCR unit in question) or an internal combustion engine operably connected to the EAS compared to adjusting operation parameters based on a NOx conversion efficiency at a specific single temperature. Method 500 ends at step 528.

Figure 6:
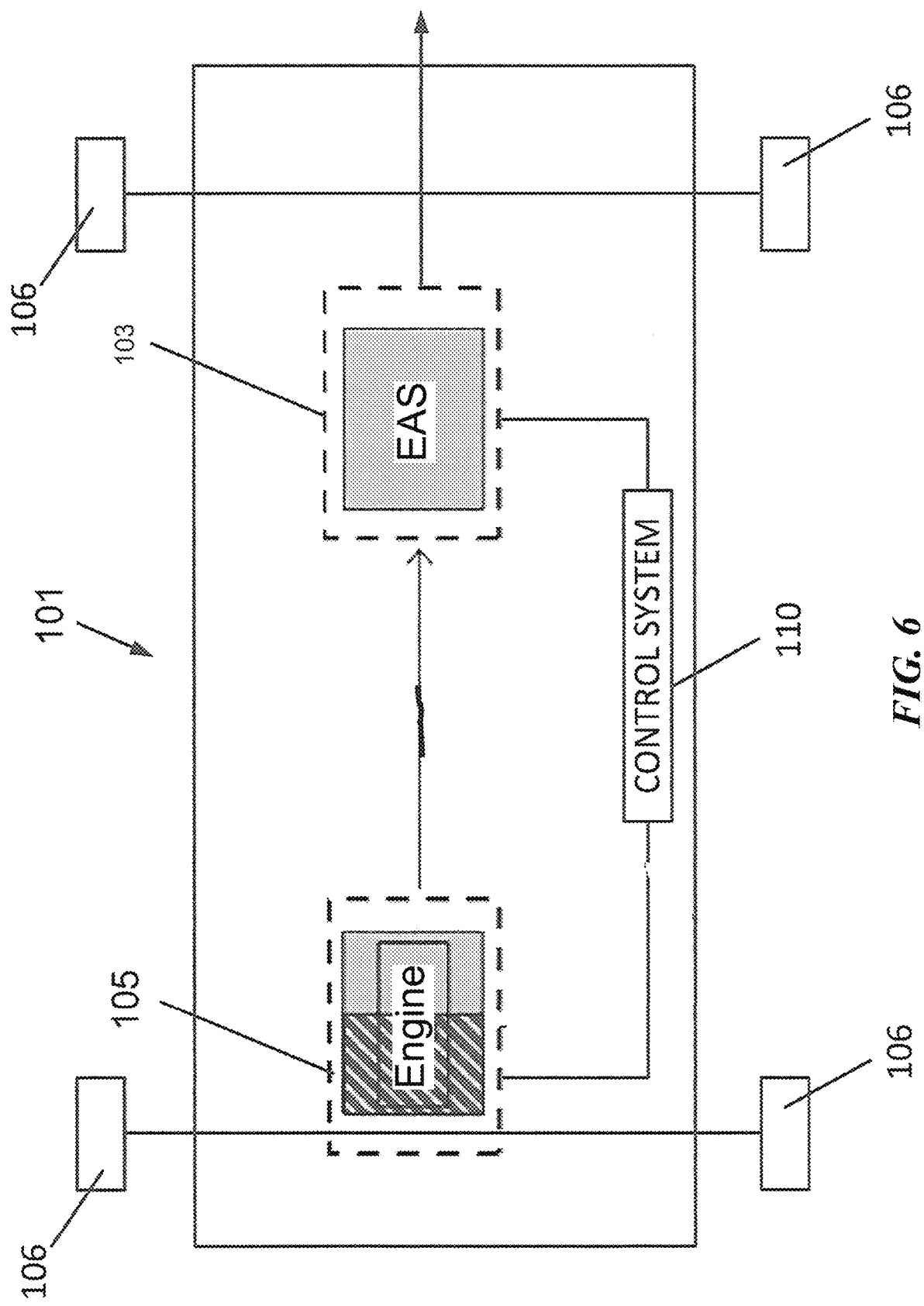
FIG. 6 illustrates a vehicle including an internal combustion engine, an emission aftertreatment system and a control system configured to control components of the engine and emission aftertreatment system according to certain methods in accordance with embodiments described herein.

FIG. 6 illustrates a schematic diagram of a vehicle 101, which may be a heavy-duty vehicle, with an internal combustion engine 105, which may be a diesel engine, an exhaust after-treatment system 103, a set of at least four wheels 106 configured to be powered and driven by the engine 105, and a control system 110, which can perform the methods described herein. When the vehicle 101 is in operation, the control system 110 can be used to control operation of portions of the vehicle 101, including its internal combustion engine 105 and its emission after-treatment system 103. For example, the control system 110 may be configured to control the engine 105 to idle with any number of its cylinders firing and any number of its cylinders deactivated, to control the engine 105 to increase the load on the engine 105, for example by driving an electric generator (not shown), to direct electrical energy generated by the electrical generator into an exhaust gas stream at a location between the engine 105 and the emission after-treatment system 103, to increase or decrease the temperature of the gases exhausted from the engine and/or to increase or decrease the volumetric flow of air through the engine. These examples of functions the control system 110 is able to control or initiate are not exhaustive. The control system 110 in accordance with embodiments of the present disclosure may be able to control or initiate other functions of the engine or vehicle. As another example, the control system 110 may be configured to control the exhaust after-treatment system 103 and components thereof, including a diesel oxidation catalyst (DOC) unit to oxidize unburned fuel and carbon monoxide, a diesel particulate filter (DPF) to control particulate matter (PM), a selective catalytic reduction (SCR) system or unit to reduce oxides of nitrogen (NOX), and an ammonia oxidation catalyst (AMOX) system. For example, in some embodiments, the control system 110 is configured to control an amount of thermal energy introduced into the gas exhausted by the engine, to control the dosing rate of diesel exhaust fluid to the EAS and/or to control temperature of an upstream or downstream SCR unit.

In some embodiments, the vehicle 101 includes a plurality of sensors that collect and transmit data regarding operating parameters of the vehicle 101 and/or operating parameters of the EAS to the control system 110, such as continuously. For example, such sensors may collect and transmit data regarding an exhaust gas temperature, volumetric flow rate of exhaust gases, volumetric air flow rate to engine, fuel/air ratio to engine, temperature of air flow to engine, NOx content of the exhaust gas, NOx content of exhaust gas exiting the SCR units, volumetric flow of DEF dosing, temperature of the engine, an operating speed of the internal combustion engine 102 (e.g., in RPM) to the control system 110, load on the engine, temperature of SCR unit and level of exhaust gas recirculation (EGR). In some embodiments, the control system 110 may control operation of the vehicle 101, such as in accordance with any of the techniques described herein, based on such measurements and data, such as when such measurements fall below certain specified thresholds, e.g., when the exhaust gas temperature falls below any of the exhaust gas temperatures mentioned herein, such as 190° F., or when the internal combustion engine 102 is idling, as identified, for example, when the operating speed of the internal combustion engine 105 falls below 550 RPM, or 600 RPM, or 650 RPM, or 700 RPM, or 750 RPM, or 800 RPM. Other sensors may collect and transmit data regarding the EAS. For example, such sensors can collect and transmit data regarding an amount of NOx entering an upstream SCR or entering a downstream SCR, amount of NOx out of an upstream SCR or out of a downstream SCR, quantity of DEF dosing and temperature of upstream and/or downstream SCR units.

Figure 7:
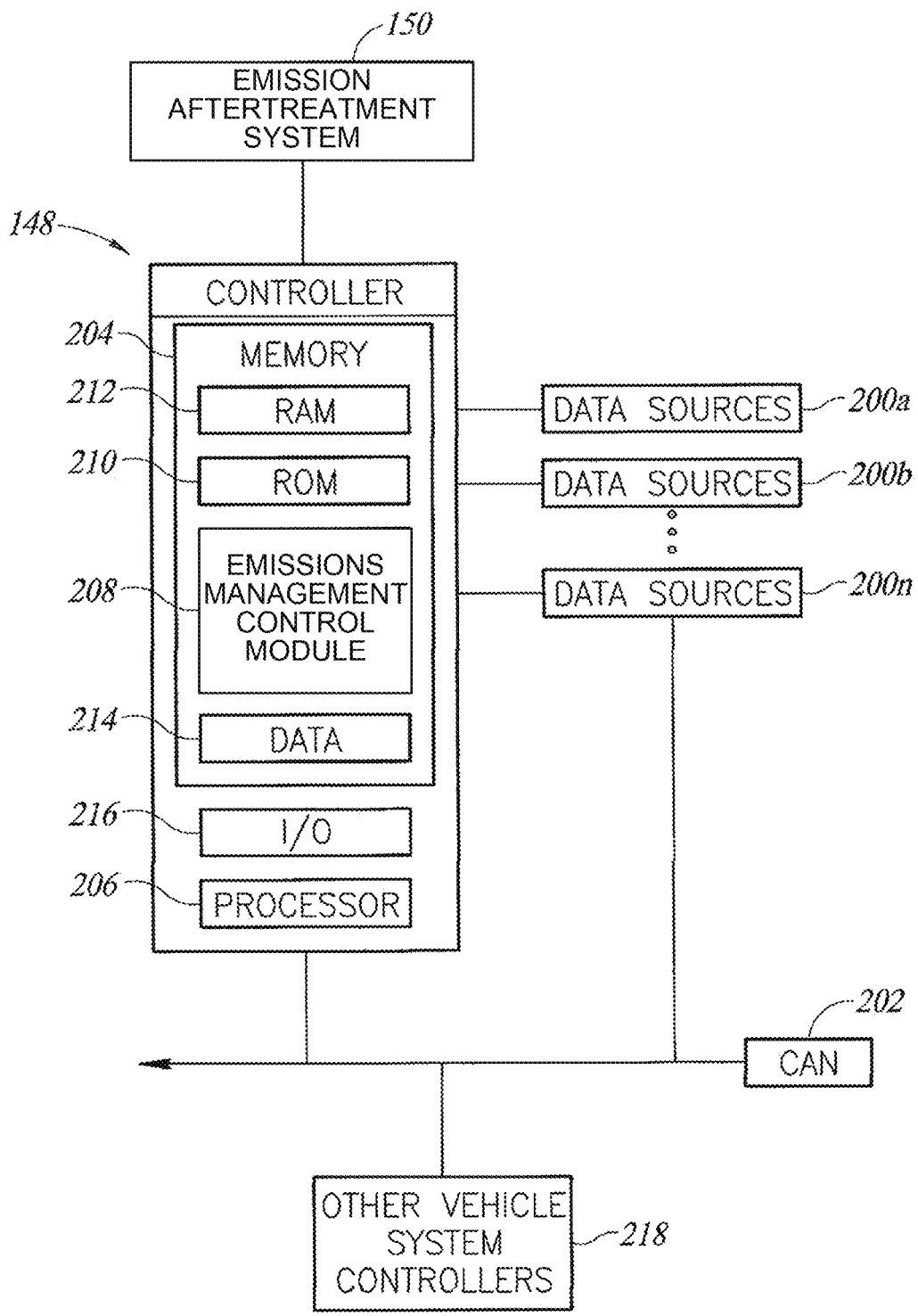
FIG. 7 is a schematic block diagram of an emission management system in accordance with some embodiments disclosed herein.

FIG. 7 shows one non-limiting example of an emissions aftertreatment system controller 148 formed in accordance with aspects of the present disclosure and can be part of the control system 110. The control system may be an emissions management system associated with an EAS system of a vehicle powered by an internal combustion engine or an EAS of an internal combustion engine implemented in a stationary application. The controller 148 is connected in electrical communication with a plurality of data sources 200a-200n (generally, data sources 200). As will be described in more detail below, the data sources 200 may include but are not limited to on-board sensors, e.g., engine sensors and EAS sensors, on-board state estimators, etc. It will be appreciated that the controller 148 can be connected directly (wired or wirelessly) to the plurality of data sources 200 or indirectly via any suitable interface, such as a CAN interface 202. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof. The controller 148 may also communicate with other electronic components of the vehicle 101 via the CAN 202 for collecting data from other electronic components to be utilized by the controller 148, and as such, can also be considered in at least some embodiments as data sources 200. For example, the controller 148 may receive data from one or more other controllers 218, such as an engine controller, a transmission controller, a brake system controller, etc. In operation, as will be described in more detail below, the controller 148 receives signals from the data sources 200, processes such signals and others, and depending on the processed signals, transmits suitable control signals for operating the EAS 150, the engine 105 or other systems or components of the vehicle 101. The controller 148 initiates operation by means of a hard wired input (e.g., ignition key 154) or by receiving a signal from a communication network (e.g., wake-up on CAN). This wake-up message allows to bring the controller 148 in operation, whereas the operator does not need to use the ignition keys or be physically in or near the vehicle 101. The controller 148 may be a standalone controller or may be part of one or more other controllers (e.g., vehicle electronic control unit (VECU)) of the vehicle 101. Generally, the emission aftertreatment system may be implemented in any local or remote controller(s) operative to provide the functionality described herein.

In at least some embodiments, the controller 148 may contain logic rules implemented in a variety of combinations of hardware circuitry components and programmed processors to effect control of the EAS 150 and other systems of the vehicle 101. To that end, as further illustrated in FIG. 7, one suitable embodiment of the controller 148 includes a nontransitory memory 204, a processor 206, and emissions management control module 208 for providing functionality of the controller 148. The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters). The controller 148 also includes one or more input/output devices or components 216 that enable the controller to communicate with one or more local or remote devices via wired or wireless communication. In at least some embodiments, the controller 148 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits, combinations of the above, among others. In at least one embodiment, the processor 206 executes instructions stored in memory 204, such as engine restart control module 208, to implement the functionality described in the present disclosure.

The emissions management control module 208 may include a set of control algorithms, including program instructions, selectable parameters, and calibrations stored in one of the storage media and executed to provide functions described herein. Information transfer to and from the module 208 may be accomplished by way of a direct connection, a local area network bus, a serial peripheral interface bus, wired or wireless interfaces, etc. The algorithms may be executed during preset loop cycles such that each algorithm is executed at least once each loop cycle. Algorithms stored in the non-volatile memory devices may be executed by the processor 206 to monitor inputs from the sensing devices and other data transmitting devices or polls such devices for data to be used therein. Loop cycles may be executed at regular intervals during ongoing operation of the vehicle 101. Alternatively or additionally, algorithms may be executed in response to the occurrence of one or more events.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The controller 148 may be a separate controller that implements the EAS management functionality described herein. However, it should be appreciated that the controller 148 may be a controller module, which could be software embedded within an existing on-board controller, such as the engine controller, a general purpose controller, other vehicle system controllers, etc.

As briefly described above, the data sources 200 can include but are not limited to on-board sensors for detecting operation parameters of an EAS, navigation/GPS devices, communications devices, data stores, remote servers, etc.

These data sources and others in at least some embodiments may be part of the electrical systems 138, control console 132, etc., described above. The data supplied from these data sources 200 and others may generally or specifically relate to vehicle operating parameters, e.g., engine or EAS operating parameters, operator driving trends and accessories (e.g., loads 220) usage patterns and characteristics, and external parameters, including present vehicle navigation, traffic patterns, weather data, sunrise and sunset data, temperature data, among others.

One or more implementations of the present disclosure are directed to systems and methods for evaluating NOx conversion efficiency of a close coupled SCR unit of an emission aftertreatment system for an internal combustion engine, for example, a diesel engine of a light-duty or heavy-duty vehicle. In at least some implementations, the systems and methods are operative to evaluate and record conversion efficiency of a close coupled SCR unit at a plurality of different temperatures while operating a downstream SCR unit to reduce NOx content of exhaust flowing through the EAS. The evaluation of NOx conversion efficiency close coupled SCR unit at a plurality of temperatures in accordance with disclosed embodiments are used, to diagnose the close coupled SCR unit and/or the EAS or control operation of the EAS and/or the internal combustion engine.

In other implementations, embodiments described herein relate to any emissions management system for a vehicle including an internal combustion engine and an EAS. Such systems include a processor, which in operation, receives indications of NOx conversion efficiency for at a plurality of temperatures for a close coupled SCR unit. The processor's stores the received indications of NOx conversion efficiency in a non-transitory processor readable storage medium, and evaluate performance of the EAS using the received and stored indications of NOx conversion efficiency of the close coupled SCR unit at the plurality of temperatures.

Although exemplary embodiments of the present disclosure are described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, generator sets, etc. In addition, embodiments of the present disclosure have application with internal combustion engines which are not associated with vehicles. For example, embodiments of the present disclosure have application with internal combustion engines that are utilized in stationary applications, for example, power generation. Accordingly, the foregoing descriptions and illustrations herein should be considered illustrative in nature, and thus, not limiting the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating an internal combustion engine emissions aftertreatment system (EAS) including an upstream selective catalytic reduction (SCR) unit and a downstream SCR unit, the method comprising:
   operating the EAS at one or more steady state conditions;
   flowing exhaust gas from the internal combustion engine to the upstream SCR unit;
   flowing the exhaust gas from upstream SCR unit to the downstream SCR;
   operating the downstream SCR unit to reduce NOx content of the exhaust gas to within prescribed regulatory limits for exhausting the exhaust gas from the EAS;
   adjusting temperature of the upstream SCR unit resulting in the upstream SCR unit operating at a plurality of different temperatures;
   evaluating NOx conversion efficiency of the upstream SCR unit at the plurality of different temperatures while maintaining other EAS operating conditions at substantially steady state;
   recording the NOx conversion efficiency of the upstream SCR unit at the plurality of different temperatures;
   evaluating performance of the EAS using the recorded NOx conversion efficiency of the upstream SCR unit at the plurality of different temperatures; and
   adjusting a dosing rate of a diesel exhaust fluid doser downstream of the upstream SCR unit and upstream of the downstream SCR unit and a temperature of the downstream SCR unit based on the recorded NOx conversion efficiency of the upstream SCR unit at the plurality of different temperatures.

2. The method of claim 1, wherein adjusting an operation parameter of the EAS based on the recorded NOx conversion efficiency of the upstream SCR unit at the plurality of different temperatures includes determining a difference between the recorded NOx conversion efficiency of the upstream SCR unit at the plurality of different temperatures and known NOx conversion efficiency for a SCR unit at the plurality of different temperatures.

3. The method of claim 2 wherein the known NOx conversion efficiency for a SCR unit at the plurality of different temperatures is determined at an ammonia to NOx ratio equal to an ammonia to NOx ratio at which the NOx conversion efficiency of the upstream SCR unit at the plurality of different temperatures is evaluated.

4. The method of claim 1, wherein operating the EAS at one or more steady state conditions includes operating the EAS at one more of a constant temperature of the exhaust gas flowing to the upstream SCR unit, a constant volumetric flow of the exhaust gas flowing to the upstream SCR unit or a constant NOx content of the exhaust gas flowing to the upstream SCR unit.

5. The method of claim 1, wherein the adjusting, in stepwise increments, the temperature of the upstream SCR unit further comprises introducing, in stepwise increments, thermal energy to the exhaust gas upstream of the upstream SCR unit.

6. The method of claim 1, wherein the adjusting, in stepwise increments, the temperature of the upstream SCR unit further comprises increasing, in stepwise increments, the temperature of the exhaust gas entering the upstream SCR unit.

7. The method of claim 1, wherein the adjusting operation parameters of the EAS includes introducing thermal energy into the exhaust gas flowing into the upstream SCR unit.

8. The method of claim 1, wherein the adjusting operation parameters of the EAS includes adjusting an amount of DEF dosed to the exhaust gas upstream of the upstream SCR unit.

9. A method of evaluating NOx conversion efficiency of an upstream SCR unit of an emissions aftertreatment system (EAS) including the upstream SCR unit and a downstream SCR unit, the method comprising:
   operating the EAS at one or more steady state conditions;
   flowing exhaust gas from the internal combustion engine through the upstream SCR unit;
   flowing exhaust gas from the upstream SCR unit through the downstream SCR unit; reducing NOx in the exhaust gas in the downstream SCR unit to within prescribed regulatory limits for exhausting the exhaust gas from the EAS;
   adjusting temperature of the upstream SCR unit resulting in the upstream SCR unit operating at a plurality of different temperatures;
   evaluating NOx conversion efficiency of the upstream SCR unit at a plurality of different temperatures while maintaining other EAS operating conditions at substantially steady state;
   recording the NOx conversion efficiency of the upstream SCR unit at the plurality of different temperatures;
   evaluating performance of the upstream SCR unit using the recorded NOx conversion efficiency of the upstream SCR unit at the plurality of different temperatures; and
   adjusting a dosing rate of a diesel exhaust fluid doser downstream of the upstream SCR unit and upstream of the downstream SCR unit; and adjusting a temperature of the downstream SCR unit based on the recorded NOx conversion efficiency of the upstream SCR unit at the plurality of different temperatures.

10. The method of claim 9 wherein evaluating performance of the upstream SCR unit using the recorded NOx conversion efficiency of the upstream SCR unit at the plurality of different temperatures includes determining a difference between the recorded NOx conversion efficiency of the upstream SCR unit at the plurality of different temperatures and known NOx conversion efficiency for a SCR unit at the plurality of different temperatures.

11. The method of claim 10 wherein the known NOx conversion efficiency for a SCR unit at the plurality of different temperatures is determined at an ammonia to NOx ratio (ANR) equal to an ANR at which the NOx conversion efficiency of the upstream SCR unit at the plurality of different temperatures is evaluated.

12. The method of claim 9, further comprising operating the internal combustion engine such that temperature of the exhaust gas exiting the internal combustion engine is substantially constant and volumetric flow of the exhaust gas exiting the internal combustion engine is substantially constant.

13. The method of claim 9, wherein adjusting the temperature of the upstream SCR unit further comprises introducing thermal energy to the exhaust gas upstream of the upstream SCR unit.

14. The method of claim 9, further comprising issuing a diagnostic signal based on a determination that more than one of the received indications of NOx conversion efficiency of the upstream SCR unit operated at the plurality of temperatures varies from a threshold NOx conversion efficiency value by a predetermined amount.

15. An emissions management system for a vehicle including an internal combustion engine and an emission aftertreatment system (EAS) that includes an upstream SCR unit and a downstream SCR unit, the emissions management system comprising:
   at least one nontransitory processor-readable storage medium that stores one of processor-executable instructions or data; and
   at least one processor communicatively coupled to the at least one nontransitory processor-readable storage medium, in operation, the at least one processor:
      causes a temperature of the upstream SCR unit to be adjusted causing the upstream SCR unit to be operated at a plurality of temperatures;
      receives indications of NOx conversion efficiency of the upstream SCR unit at the plurality of temperatures at which the upstream SCR unit is operated;
      stores the received indications of NOx conversion efficiency of the upstream SCR unit for the plurality of temperatures at which the upstream SCR unit is operated in the nontransitory processor-readable storage medium;
      evaluates performance of the EAS using the received indications of NOx conversion efficiency of the upstream SCR unit at the plurality of temperatures at which the upstream SCR unit is operated; and
      initiates an adjustment of a temperature of the downstream SCR unit; wherein the adjustment of the temperature of the downstream SCR unit is based on the stored received NOx conversion efficiency of the upstream SCR unit at the plurality of different temperatures.

16. The emissions management system of claim 15, wherein the at least one processor issues a diagnostic signal based on a determination that more than one of the received indications of NOx conversion efficiency of the upstream SCR unit operated at the plurality of temperatures varies from a threshold NOx conversion efficiency value by a predetermined amount.

17. The emissions management system of claim 15, wherein at least one processor controls operation of the internal combustion engine using the indications of NOx conversion efficiency of the upstream SCR unit operated at a plurality of temperatures.

18. Emissions management system of claim 17, where the at one processor initiates an adjustment of one or more of speed (rpms) of the internal combustion engine, a load on the internal combustion engine, an air to fuel ratio, a level of exhaust gas recirculation and a temperature of air flow to the internal combustion engine.

19. The emissions management system of claim 15, wherein the at least one processor controls operation of the EAS using the indications of NOx conversion efficiency of the upstream SCR unit operated at a plurality of temperatures.

* * * * *

UNITED STATES PATENT AND TRADEMARK OFFICE
CERTIFICATE OF CORRECTION

| | | |
|---|---|---|
| PATENT NO. | : 11,976,582 B2 | Page 1 of 1 |
| APPLICATION NO. | : 17/002496 | |
| DATED | : May 7, 2024 | |
| INVENTOR(S) | : Charles Wayne Reinhardt Swart et al. | |

It is certified that error appears in the above-identified patent and that said Letters Patent is hereby corrected as shown below:

In the Claims

Column 19, Claim 9, Line 16:
"within prescri bed" should read: --within prescribed--.

Column 20, Claim 18, Line 51:
"Emissions management system" should read: --The emissions management system--.

Signed and Sealed this
Thirteenth Day of August, 2024

Katherine Kelly Vidal
*Director of the United States Patent and Trademark Office*